(12) United States Patent
Williams et al.

(10) Patent No.: US 10,926,607 B2
(45) Date of Patent: Feb. 23, 2021

(54) VEHICLE WITH CARGO BED INCORPORATING AIRFLOW INTAKE AND DISCHARGE DUCTS

(71) Applicant: Toyota Motor Engineering & Manufacturing North America, Inc., Plano, TX (US)

(72) Inventors: Paxton S. Williams, Milan, MI (US); Scott Louis Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 24 days.

(21) Appl. No.: 16/399,041

(22) Filed: Apr. 30, 2019

(65) Prior Publication Data
US 2020/0346521 A1    Nov. 5, 2020

(51) Int. Cl.
| | | |
|---|---|---|
| *B60H 1/24* | (2006.01) | |
| *B60H 1/00* | (2006.01) | |
| *B60H 1/26* | (2006.01) | |
| *B60J 7/10* | (2006.01) | |

(52) U.S. Cl.
CPC ......... *B60H 1/244* (2013.01); *B60H 1/00564* (2013.01); *B60H 1/248* (2013.01); *B60H 1/26* (2013.01); *B60J 7/104* (2013.01)

(58) Field of Classification Search
CPC ...... B60H 1/26; B60H 1/00564; B60H 1/244; B60H 1/248; B60H 1/3235
USPC ........ 296/208, 70, 192, 214, 63, 108, 97.23, 296/96.21; 180/65.1, 402, 165, 291, 180/65.5; 454/121, 127, 143, 144, 152
See application file for complete search history.

(56) References Cited

U.S. PATENT DOCUMENTS

| | | | |
|---|---|---|---|
| 1,618,152 A * | 2/1927 | Hutchins | B60H 1/248 454/138 |
| 4,932,705 A | 6/1990 | Miller | |
| 5,040,455 A * | 8/1991 | Doi | B60H 1/00428 454/162 |
| 5,069,357 A | 12/1991 | Anderson | |
| 5,398,985 A | 3/1995 | Robinson | |
| 5,560,219 A | 10/1996 | Vegara | |
| 5,779,536 A * | 7/1998 | McCorkel | B60H 1/00378 454/137 |
| 8,540,304 B2 * | 9/2013 | Kint | B62D 35/001 296/180.1 |
| 10,093,150 B2 | 10/2018 | Waldner | |
| 10,112,465 B2 | 10/2018 | Flocco | |
| 2016/0176385 A1 * | 6/2016 | Wolf | F16D 65/847 296/208 |

* cited by examiner

*Primary Examiner* — D Glenn Dayoan
*Assistant Examiner* — Sunsurraye Westbrook
(74) *Attorney, Agent, or Firm* — Christopher G. Darrow; Darrow Mustafa PC

(57) ABSTRACT

A vehicle includes a first wall defining a portion of a cargo bed of the vehicle. The first wall has an opening. The vehicle also includes at least one duct having a first opening, a second opening, and an airflow passage extending between the first and second openings. The at least one duct first opening is in fluid communication with the opening in the first wall. An airflow regulation mechanism is operably coupled to the at least one duct first opening and is configured to enable control of an air flow into the at least one duct first opening.

12 Claims, 3 Drawing Sheets

VEHICLE WITH CARGO BED INCORPORATING AIRFLOW INTAKE AND DISCHARGE DUCTS

The subject matter described herein relates in general to vehicle tonneau covers and, more particularly, to a tonneau cover having a storage cavity formed usable for drying wet articles during motion of a vehicle.

BACKGROUND

Items of clothing and other items (such as towels, sports equipment, camping gear, etc.) may become wet due to rain or participation of a user in recreational activities. The user may not wish to bring wet items into a vehicle passenger compartment, due to the potential for damage to the vehicle seats and other portions of the interior.

SUMMARY OF THE INVENTION

In one aspect of the embodiments described herein, a vehicle is provided including a first wall defining a portion of a cargo bed of the vehicle. The first wall has an opening. The vehicle also includes at least one duct having a first opening, a second opening, and an airflow passage extending between the first and second openings. The at least one duct first opening is in fluid communication with the opening in the first wall. An airflow regulation mechanism is operably coupled to the at least one duct first opening and is configured to enable control of an air flow into the at least one duct first opening.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
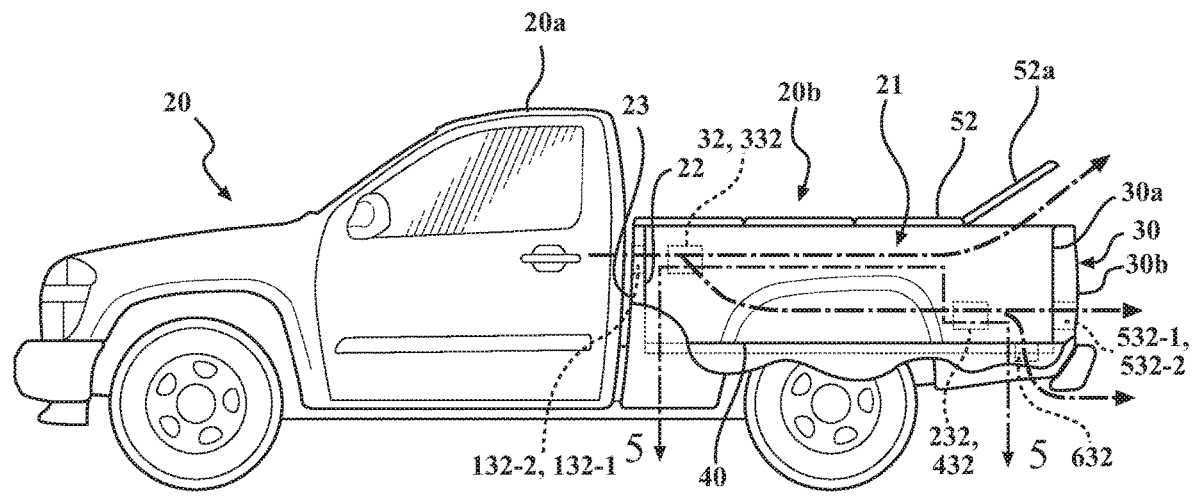
FIG. 1 is a schematic cross-sectional side view of a vehicle incorporating airflow intake and discharge ducts in accordance with embodiments described herein.

In one or more arrangements described herein, a vehicle includes a first wall defining a portion of a cargo bed. The first wall has an opening. At least one duct is provided having a first opening, a second opening, and an airflow passage extending between the duct first and second openings. The duct first opening is in fluid communication with the opening in the first wall. An airflow regulation mechanism is operably coupled to the duct first opening and configured to enable control of an air flow into the at least one duct first opening. The duct airflow passage may provide a path for airflow into or out of a cargo bed of the vehicle. This enables air to be circulated through the cargo bed for drying objects positioned in the cargo bed, for example.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar reference numerals in different figures refer to elements common to the different figures. Also, numerous specific details are set forth in order to provide a thorough understanding of the embodiments described herein. However, it will be understood by those of ordinary skill in the art that the embodiments described herein can be practiced without these specific details.

FIGS. 1-5 show various views of a vehicle in the form of a pickup truck 20 incorporating airflow ducts in accordance with embodiments described herein. Although embodiments described herein relate to a pickup truck with a cargo bed, the duct structures described may be incorporated into other types of vehicles having interior regions into which it is desirable to direct a flow of air for various purposes.

Figure 2:
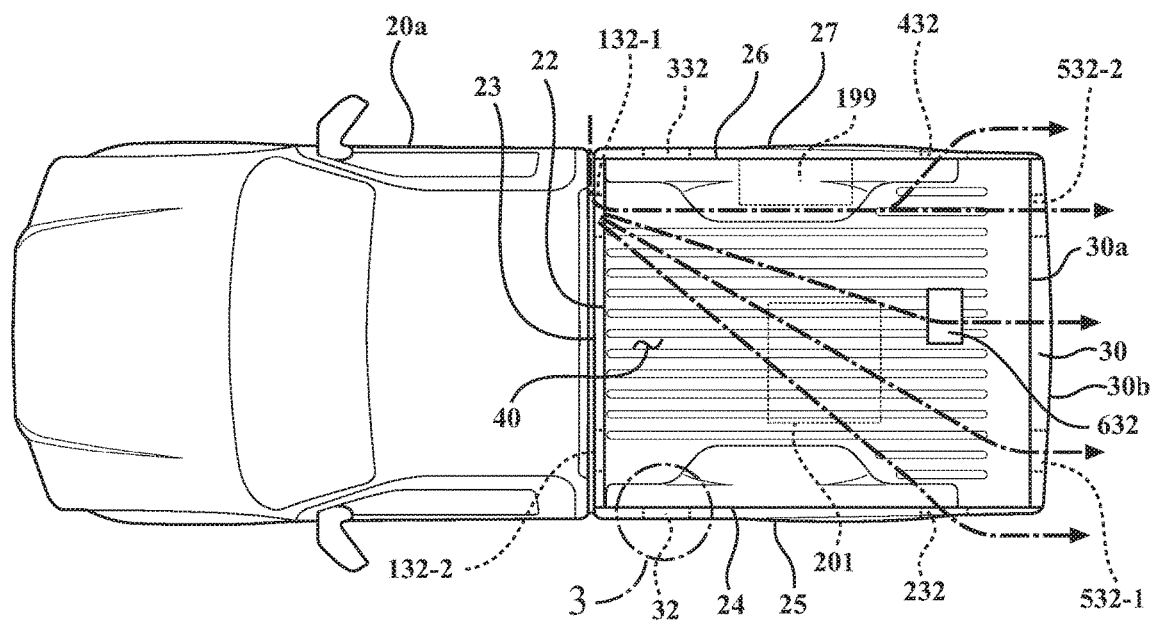
FIG. 2 is a schematic plan view of the vehicle shown in FIG. 1.

Referring to FIGS. 1 and 2, truck 20 may include a cab 20a and rear portion 20b attached to the cab 20a and incorporating a cargo bed 21. Cargo bed 21 may be defined by interior walls or panels. More specifically, the cargo bed 21 may be defined by a front interior wall 22, side interior walls 24, 26, a floor 40, and an interior wall portion 30a of a vehicle tailgate 30. Additional walls may reside opposite associated ones of the interior walls and may define portions of the vehicle exterior of the cargo bed. For example, a front exterior wall 23 may reside opposite the front interior wall 22. Side exterior walls 25, 27 may reside opposite respective ones of side interior walls 24, 26. An exterior wall portion 30b of the tailgate 30 may reside opposite the interior wall portion 30a of the tailgate 30. Empty space sufficient to enable mounting of duct structures as described herein may be provided between one or more of the various interior walls and their associated exterior walls. For example, as described below with respect to FIG. 3, a duct 32 may extend between a side exterior wall 25 and an associated side interior wall 24 to enable fluid communication between an exterior of the cargo bed 21 and the cargo bed.

Figure 3:
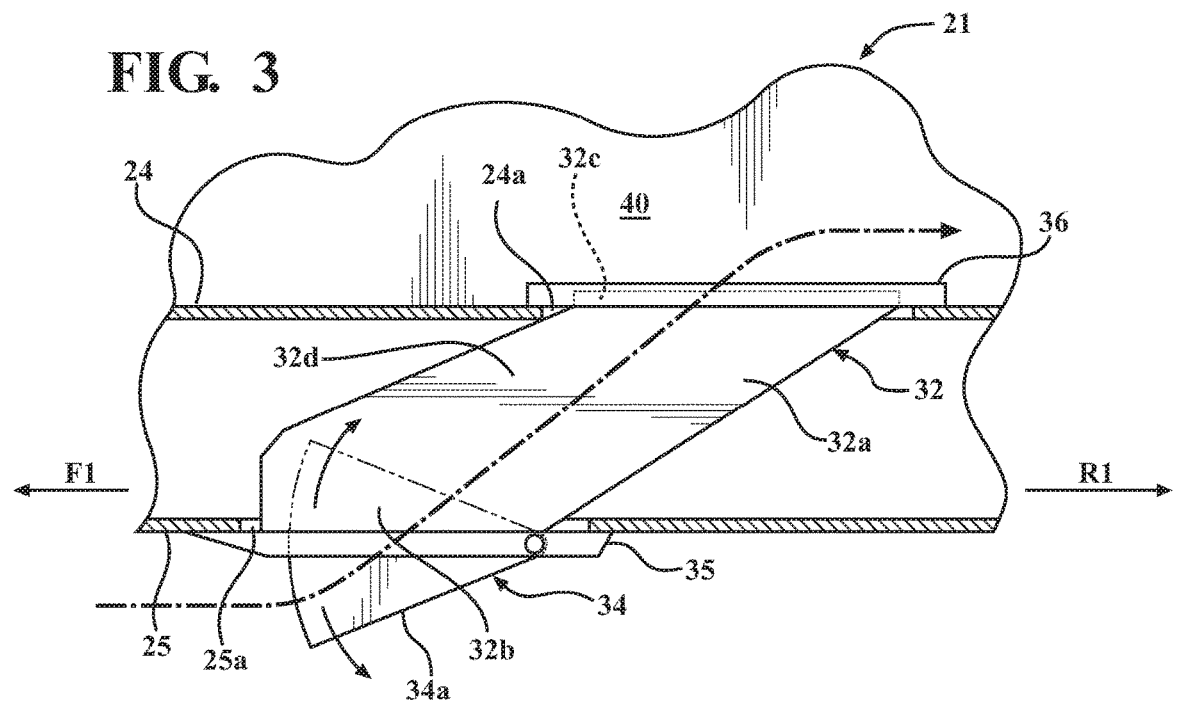
FIG. 3 is a plan cross-sectional view of a portion of a side of the vehicle of FIG. 1 along the cargo bed, in accordance with embodiments described herein.

FIG. 3 is a plan cross-sectional view of a portion of a side of the vehicle 20 along the cargo bed 21. A first wall (e.g., a cargo bed side interior wall 24) may define a portion of the cargo bed 21. The first wall 24 may have an opening 24a. At least one duct 32 may extend between the side interior wall 24 and an associated side exterior wall 25. The at least one duct 32 may be configured to enable fluid communication between the cargo bed 21 and an exterior of the cargo bed. The duct 32 may include a tubular member 32a defining a duct first opening 32b, a duct second opening 32c, and an airflow passage 32d extending between the first and second openings 32b, 32c. The duct first opening 32b may be in fluid communication with the opening 24*a* in the first wall 24 via the airflow passage 32*d*.

An airflow regulation mechanism (generally designated 34) may be operably coupled to the duct first opening 32*b*. The airflow regulation mechanism 34 may be configured to enable adjustment of a rate of air flow into the duct first opening 32*b*. In one or more arrangements, the airflow regulation mechanism 34 may include a door 34*a* which is rotatable or otherwise operable to control a rate of flow of air through the duct first opening 32*b*. The mechanism 34 may also include a door securement or locking mechanism (not shown) structured to enable the door 34*a* to be maintained in any of a variety of partially open positions or a fully open position, to enable any of a variety of associated airflow rates into the duct first opening 32*b*. The door 34*a* may be configured to act as a "scoop" when in an open condition, to deflect and direct air impinging on the door into the duct first opening 32*b*. The door 34*a* may also be closable and securable to block a flow of air through the duct first opening 32*b*. The door 34*a* may be operated manually by a user. The door 34*a* may have a filter (not shown) mounted along a portion of the door leading into the duct first opening 32*b*, to prevent dust and particulates from entering the airflow passage 32*d*.

In one example of a locking mechanism applicable to doors (such as door 34*a*) described herein, a hinge or shaft connecting the door to the remainder of the tonneau cover may be coupled to a spiral wound spring or another type of spring. The spiral spring may be structured to bias the door toward the closed condition. A ratchet may be attached to the shaft, and a spring-loaded pawl may be rotatably mounted to the remainder of the tonneau cover adjacent the door. The ratchet and pawl may be engageable to hold the door in any one of several partially open configurations as a user rotates the door and ratchet against the biasing force of the spring. The user may manually disengage the pawl in a known manner to allow the spring to close the door.

A first end of duct tubular member 32*a* may be attached to a first flange 35 which may also incorporate or house the airflow regulation mechanism 34. The first flange 35 may be configured to be attachable to a wall or panel of the vehicle (such as exterior wall 25) using fasteners or any other suitable method, thereby securing the duct first opening 32*b* in a desired position relative to an associated wall opening, for receiving an airflow into the airflow passage 32*d*. A second end of duct tubular member 32*a* may be attached to a second flange 36. The second flange 36 may be configured to be attachable to a wall or panel of the vehicle (such as interior wall 24 shown in FIG. 3) using fasteners or any other suitable method, thereby securing the duct second opening 32*c* in a desired position relative to an associated wall opening, so that an airflow may exit the duct second opening 32*c* into the cargo bed 21 or to an exterior of the vehicle 20, as described herein.

In one or more arrangements, the cross-sectional area of duct tubular member 32*a* may decrease in the direction of airflow, to increase the velocity of airflow entering the cargo bed 21. In other arrangements, the cross-sectional area of duct tubular member 32*a* may be constant along the length of the duct.

In one or more arrangements, the duct tubular member 32*a* may angle in a rearward direction R1 of the vehicle 20 as shown in FIG. 3, in a direction from the duct first opening 32*b* toward the duct second opening 32*c*. This angling of the duct works to accommodate or be consistent with a direction of airflow into the duct first opening 32*b* when the vehicle 20 is moving in a forward direction F1.

Figure 4:
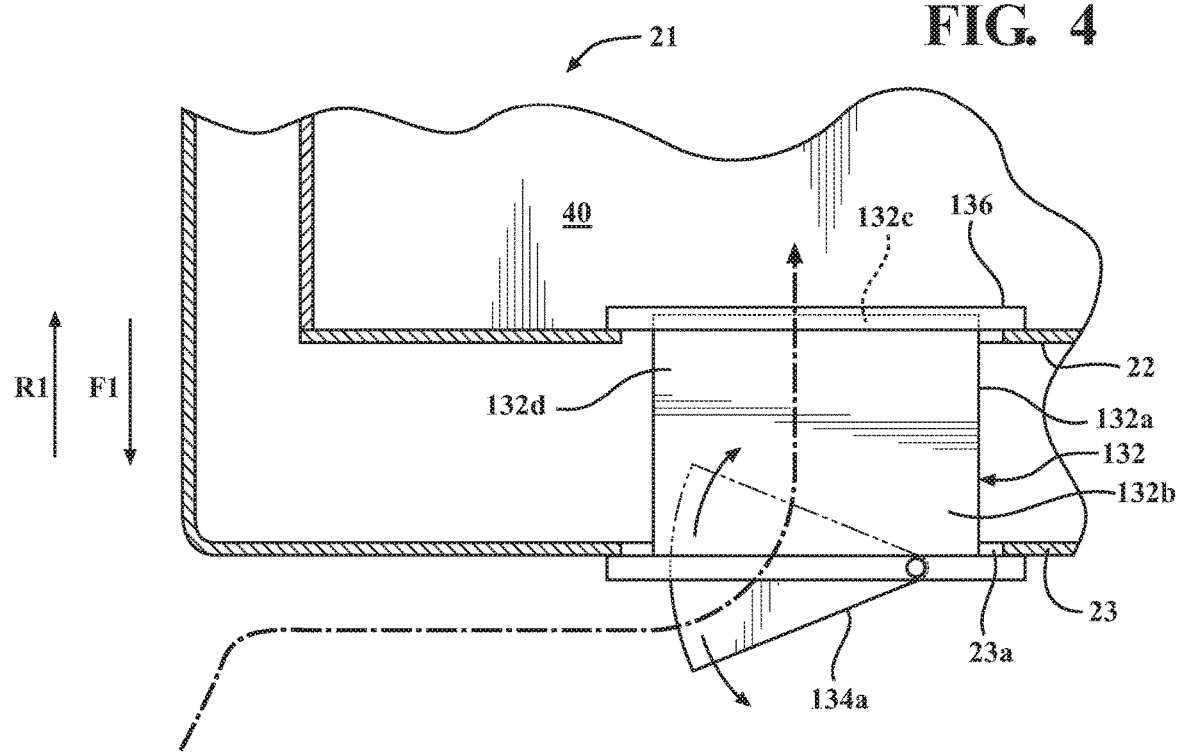
FIG. 4 is a plan cross-sectional view of a portion of a front wall of the vehicle of FIG. 1 along the cargo bed, in accordance with embodiments described herein.

FIG. 4 shows another example of a duct 132 similar to duct 32 which extends between the front exterior wall 23 and the front interior wall 22 of the cargo bed 21. In this arrangement, the duct 132 and the resulting airflow axis through the duct tubular member 132*a* may extend perpendicular to the walls 22, 23 between which the duct 132 extends.

In one or more arrangements, the first wall defining the portion of the cargo bed 21 may be a side interior wall of the cargo bed, such as wall 24 shown in FIG. 3 or wall 26 shown in FIG. 2.

In one or more arrangements, the first wall defining the portion of the cargo bed 21 may be a front interior wall of the cargo bed 21, such as wall 22 shown in FIGS. 2 and 4.

In one or more arrangements, the first wall defining the portion of the cargo bed 21 may be a floor 40 of the cargo bed, as shown in FIGS. 1 and 2.

In one or more arrangements, the first wall defining the portion of the cargo bed 21 may be an interior wall portion 30*a* of tailgate 30, as shown in FIGS. 1 and 2.

In one or more arrangements, the first wall defining a portion of the cargo bed may be a floor 40 of the cargo bed, such as shown in FIGS. 1 and 2.

Referring again to FIG. 3, in an example where the first wall is a side interior wall, another wall (in the example shown, a side exterior wall 25) may reside opposite the first wall 24 and may define a portion of the vehicle exterior of the cargo bed 21, as previously described. The other wall 25 may have an opening 25*a*. The duct second opening 32*c* may be in fluid communication with the opening 24*a* in the first wall 24. The duct first opening 32*b* may be in fluid communication with the opening 25*a* in the other wall 25. The duct first opening 32*b* is also in fluid communication with the opening 24*a* in the first wall 24 via the airflow passage 32*d*. In this particular embodiment, the airflow regulation mechanism 34 is operable to control a flow of atmospheric air from an environment exterior of the vehicle 20 into the duct first opening 32*b*. In the particular embodiment, the airflow entering the duct first opening 32*b* is conveyed through the airflow passage 32*d* and exits the duct second opening 32*c*/first wall opening 24*a* into the cargo bed 21.

While the example of FIG. 3 is described for a side interior 24 wall and side exterior wall 25 of the cargo bed 21, the same general duct structure may also extend between any two opposed walls of the cargo bed. For example, the same general duct structure (in the form of duct 132) may be applied to the front interior wall 22 and exterior wall 23 of the cargo bed as shown in FIG. 4. The duct structure 132 may extend between the front exterior wall 23 and the front interior wall 22, with a door 134*a* positioned to enable an airflow into an opening 23*a* in the front exterior wall 23 and into duct first opening 132*b*, through the duct airflow passage 132*d* and out of the duct second opening 132*c* into the cargo bed 21. The door 134*a* may have a filter (not shown) mounted along a portion of the door leading into the duct first opening 132*b*, to prevent dust and particulates from entering the airflow passage 132*d*.

The same general duct structure may also be applied to extend between the interior wall portion 30*a* of tailgate 30 and an exterior wall portion 30*b* of tailgate 30, as shown in FIGS. 1 and 2, to provide a discharge duct for air to flow out of the cargo bed 21.

In one or more arrangements, the other wall defining a portion of the vehicle exterior of the cargo bed may be a side exterior wall of the cargo bed, such as one of walls 25 shown in FIGS. 2 and 3 and wall 27 shown in FIG. 2.

In one or more arrangements, the other wall defining a portion of the vehicle exterior of the cargo bed may be a front exterior wall of the cargo bed, such as wall 23 shown in FIGS. 1, 2, and 4.

In one or more arrangements, the other wall defining a portion of the vehicle exterior of the cargo bed may be an exterior wall portion 30*b* of the tailgate 30, as shown in FIGS. 1 and 2.

Referring again to FIG. 1, a tonneau cover 52 may be securable to the vehicle 20 to cover the cargo bed 21. In addition, a rearmost portion 52*a* of the tonneau cover 52 may be securable in an open position as shown to enable airflow out from the cargo bed 21 between the rearmost portion 52*a* of the tonneau cover 52 and a tailgate 30 of the vehicle. In this manner, air flowing into the cargo bed 21 through the duct(s) described herein may be discharged through the opening in the upper, rearmost part of the cargo bed 21.

Figure 5:
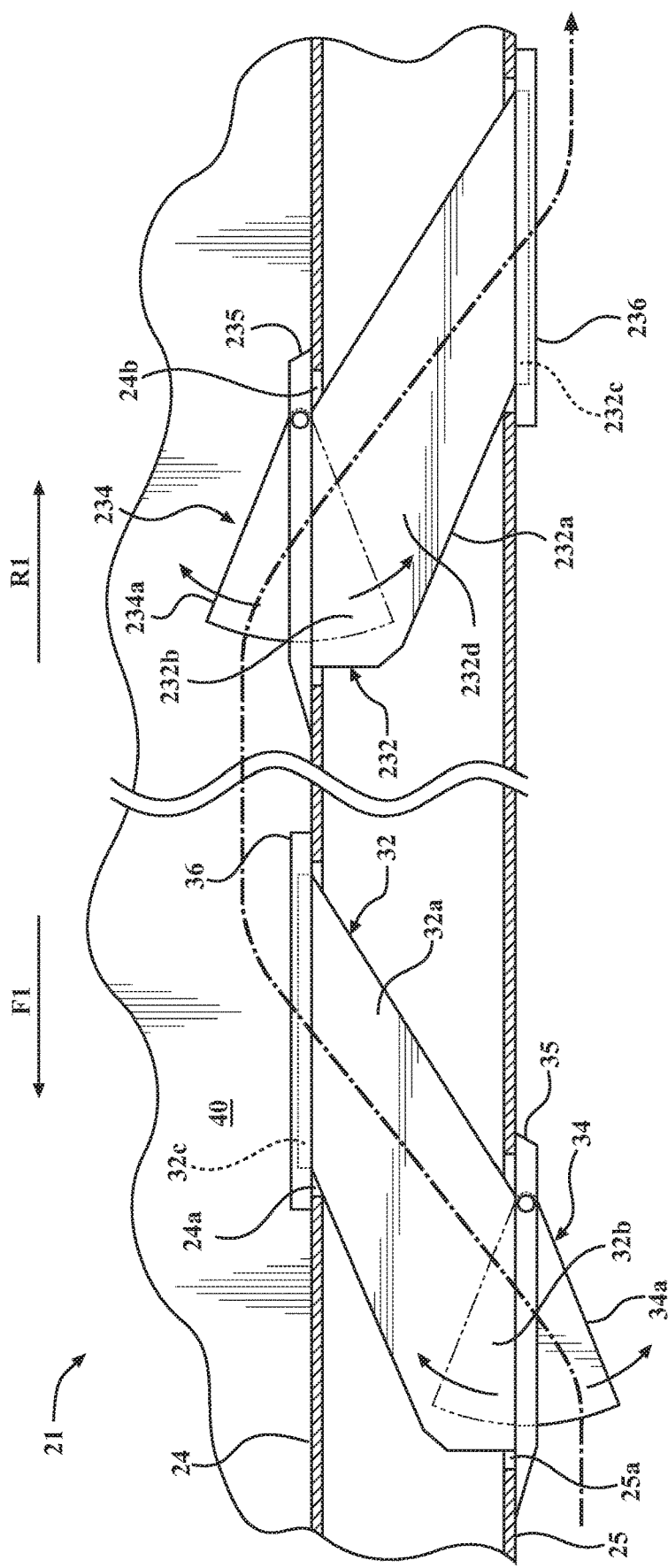
FIG. 5 is a plan cross-sectional view of another portion of a side of the vehicle of FIG. 1 along the cargo bed, in accordance with embodiments described herein.

FIG. 5 is a plan cross-sectional view of another portion of a side of the vehicle 20 along the cargo bed 21, in accordance with embodiments described herein. The view of FIG. 5 includes the side of the cargo bed and duct structure shown in FIG. 3 and previously described. Referring to FIG. 5, in one or more arrangements, as well as opening 24*a*, the first wall 24 forming a portion of the cargo bed 21 may include another opening 24*b*. In addition, the vehicle 20 may further include at least one other duct 232 having a tubular member 232*a*, first opening 232*b*, a second opening 232*c*, and an airflow passage 232*d* extending between the first and second openings. The other duct first opening 232*b* may be in fluid communication with the opening 24*b* in the first wall 24. Also, another airflow regulation mechanism 234 may be operably coupled to the other duct first opening 232*b*. The other airflow regulation mechanism 234 may be configured to enable adjustment of a rate of air flow from the cargo bed 21 into the other duct first opening 232*b*, then through the airflow passage 232*d* to the atmosphere exterior of the vehicle 20. The other airflow regulation mechanism 234 may have the same structure as the airflow regulation mechanism 34 previously described. In this arrangement, the additional opening 24*b* in the first wall 24 may be used as an outflow or discharge opening from the cargo bed 21, with the other duct 232 used as a discharge duct.

In one or more arrangements, the duct 232 and the duct 32 previously described may have the same structure. For example, in the embodiment shown in FIG. 5, duct tubular member 32*a* with first flange 35 already attached thereto may be inserted into opening 25*a*, and an end of the duct including duct second opening 32*c* may be fed through opening 24*a* in first wall 24. The first flange 35 may then be secured to the other wall 25. Then, second flange 36 may be applied to the end of duct tubular member 32*a* extending through the first wall opening 24*a*. The second flange 36 may be secured to the duct tubular member 32*a* using fasteners or any other suitable method.

The other duct 232 may be positioned and secured to the walls 24 and 25 in the same manner, with the duct tubular member 232*a* being inserted into the opening 24*b* in first wall 24. First flange 235 may be secured to first wall 24 and the second flange 236 may be applied and secured to the end of the duct tubular member 232*a* extending through the other wall opening 25*b*, as previously described.

The principles of operation of the various ducts disclosed herein may be described with reference to the particular embodiment shown in FIG. 5. When it is desired to provide an airflow through the cargo bed 21 when the vehicle is moving, door 34*a* may be opened to a desired extent and secured in the opened position, to enable air flowing around the vehicle to flow into the airflow passage 32*d* of duct 32 and into the cargo bed 21. To ensure that the air drawn into the cargo bed 21 remains in motion and to aid in preventing excessive back pressure at the intake duct 32, door 234*a* controlling airflow through duct 232 may be opened to a desired extent and secured in the opened position, to enable air flowing through the cargo bed 21 to be discharged back to the atmosphere surrounding the vehicle 20. As the vehicle moves forward in direction F1, air is deflected into the cargo bed by door 34*a* and into duct 32, then discharged back to the atmosphere through duct 232. In vehicles incorporating ducts for both intake and discharge of air, the cross-sectional areas of the ducts may be specified so as to help ensure that the total discharge capacity of any discharge ducts and/or openings matches the total intake capacity of the intake ducts, to maximize airflow and minimize back pressure.

FIGS. 1 and 2 show examples of possible locations of ducts as described herein which may be incorporated into the vehicle 20. The various arrows shown in phantom indicate possible directions of airflow into ducts being used as intake ducts, through the cargo bed, and out of the cargo bed through ducts being used as discharge ducts.

In various arrangements, ducts may be provided at any number of the locations shown, or at all the locations shown. For example, one or more ducts 132-1 and 132-2 may extend between the cargo bed front walls 22, 23, between the cab 20*a* and the cargo bed 21. One or more ducts 32, 232, 332, 432 may be provided along either or both of the cargo bed interior side walls 24, 26 and associated exterior side walls 25, 27. One or more ducts 532-1 and 532-2 (which may be structurally similar to ducts 132-1 and 132-2) as previously described may be provided extending through the vehicle tailgate 30. In addition, one or more ducts 632 may be provided along the cargo bed floor 40. In particular embodiments, a duct 632 secured to cargo bed floor may have a structure similar to that of the discharge duct 232 shown in FIG. 5, with a flange 235 secured to the cargo bed floor 40 and a tubular member 232*a* extending from the flange 235. A flange such as second flange 236 may be eliminated, depending on the presence or absence of another wall or structure residing below the floor 40 to which the second flange 236 may be attached.

It has been determined that, by selectively opening ducts for use as intake ducts and discharge ducts, the direction of airflow through the cargo bed 21 may be tailored for specific purposes. For example, referring to FIG. 2, if an item 199 is positioned along a right interior sidewall 26 of the cargo bed 21 for drying, duct(s) 132-1 (through the cargo bed front walls 22, 23) and/or 332 (through the cargo bed sidewalls 26, 27) may be opened to provide airflow into the cargo bed 21, and ducts 432 (through the cargo bed sidewalls 26, 27) and/or 532-2 (through the tailgate 30) may be opened to enable air to be discharged from the cargo bed. Operation of these ducts may provide an airflow directed to pass over the item 199.

In another example, if an item 201 is positioned along a left side of the cargo bed 21 for drying, duct(s) 132-1 and/or 332 may be opened to provide airflow into the cargo bed 21, and ducts 232 and/or 532-1 (through the tailgate 30) may be opened to enable air to be discharged from the cargo bed. In yet another example, airflow may be directed along the cargo bed floor 40 from any intake duct and discharged through the duct 632 provided in the floor 40.

In various arrangements, ducts may be provided at locations for air intake, and ducts may be provided for air discharge. It may also be seen that the arrangement of ducts as described for purposes of intake and discharge may be for a vehicle moving forward in direction F1, and that any duct positioned at any location along the cargo bed walls may be usable for either intake of air into the cargo bed or discharge of air from the cargo bed 21, depending on airflow conditions. For example, an impeller of fan (not shown) may be positioned in the cargo bed 21 to generate an airflow through the cargo bed. The impeller may be a stand-alone impeller or the impeller may be connectible to a vehicle power source. The impeller may be oriented in the cargo bed 21 to provide airflow in any desired direction, and one or more ducts may be opened to accommodate the airflow by providing an intake path from the environment exterior of the vehicle into the cargo bed 21, and a discharge path from the cargo bed back to the vehicle exterior environment.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle comprising:
a first wall defining a portion of a cargo bed, the first wall having an opening;
at least one duct having a first opening, a second opening, and an airflow passage extending between the at least one duct first and second openings, the airflow passage extending between an environment exterior of the vehicle at one end of the airflow passage and an interior of the cargo bed at an opposite end of the airflow passage, the at least one duct first opening being in fluid communication with the opening in the first wall; and
an airflow regulation mechanism operably coupled to the at least one duct first opening and configured to enable control of an air flow into the at least one duct first opening.

2. The vehicle of claim 1 wherein the vehicle further comprises another wall defining a portion of the vehicle exterior of the cargo bed, the other wall having an opening, wherein the at least one duct second opening is in fluid communication with the opening in the first wall, wherein the at least one duct first opening is in fluid communication with the opening in the other wall, wherein the at least one duct first opening is in fluid communication with the opening in the first wall via the airflow passage, and wherein the airflow regulation mechanism is operable to control a flow of atmospheric air from an environment exterior of the vehicle into the duct first opening.

3. The vehicle of claim 2 wherein the first wall is a side interior wall of the cargo bed.

4. The vehicle of claim 2 wherein the first wall is a front interior wall of the cargo bed.

5. The vehicle of claim 2 wherein the first wall has another opening, and wherein the vehicle further comprises:
at least one other duct having a first opening, a second opening, and an airflow passage extending between the at least one other duct first and second openings, the airflow passage extending between an environment exterior of the vehicle at one end of the airflow passage and an interior of the cargo bed at an opposite end of the airflow passage, the at least one other duct first opening being in fluid communication with the opening in the first wall; and
another airflow regulation mechanism operably coupled to the at least one other duct first opening and configured to enable control of an air flow from the cargo bed into the at least one other duct first opening.

6. The vehicle claim 5 wherein the first wall is a side interior wall of the cargo bed.

7. The vehicle claim 5 wherein the first wall is a floor of the cargo bed.

8. The vehicle claim 5 wherein the first wall is an interior wall of a tailgate of the cargo bed.

9. The vehicle of claim 2 further comprising a tonneau cover securable to the vehicle to cover the cargo bed, and wherein a rearmost portion of the tonneau cover is securable in an open position enabling airflow out from the cargo bed between the rearmost portion of the tonneau cover and a tailgate of the vehicle.

10. The vehicle of claim 1 wherein the at least one duct first opening is positioned along the first wall.

11. The vehicle of claim 1 wherein the at least one duct comprises:
a first flange configured to be attachable to the vehicle proximate the at least one duct first opening, the first flange incorporating the airflow regulation mechanism; and
a tubular member connected to the first flange and defining the airflow passage.

12. The vehicle of claim 1 wherein the airflow regulation mechanism comprises a door operable to control a rate of flow of air through the at least one duct first opening, and operable to block a flow of air through the at least one duct first opening.

* * * * *